May 14, 1963

R. P. SKERRITT 3,089,651

LAWN SPRINKLER WITH TIMED AUTOMATIC SHUTOFF

Filed July 6, 1959

INVENTOR.
*Roy P. Skerritt*
BY *Barthel & Bugbee*
ATTYS.

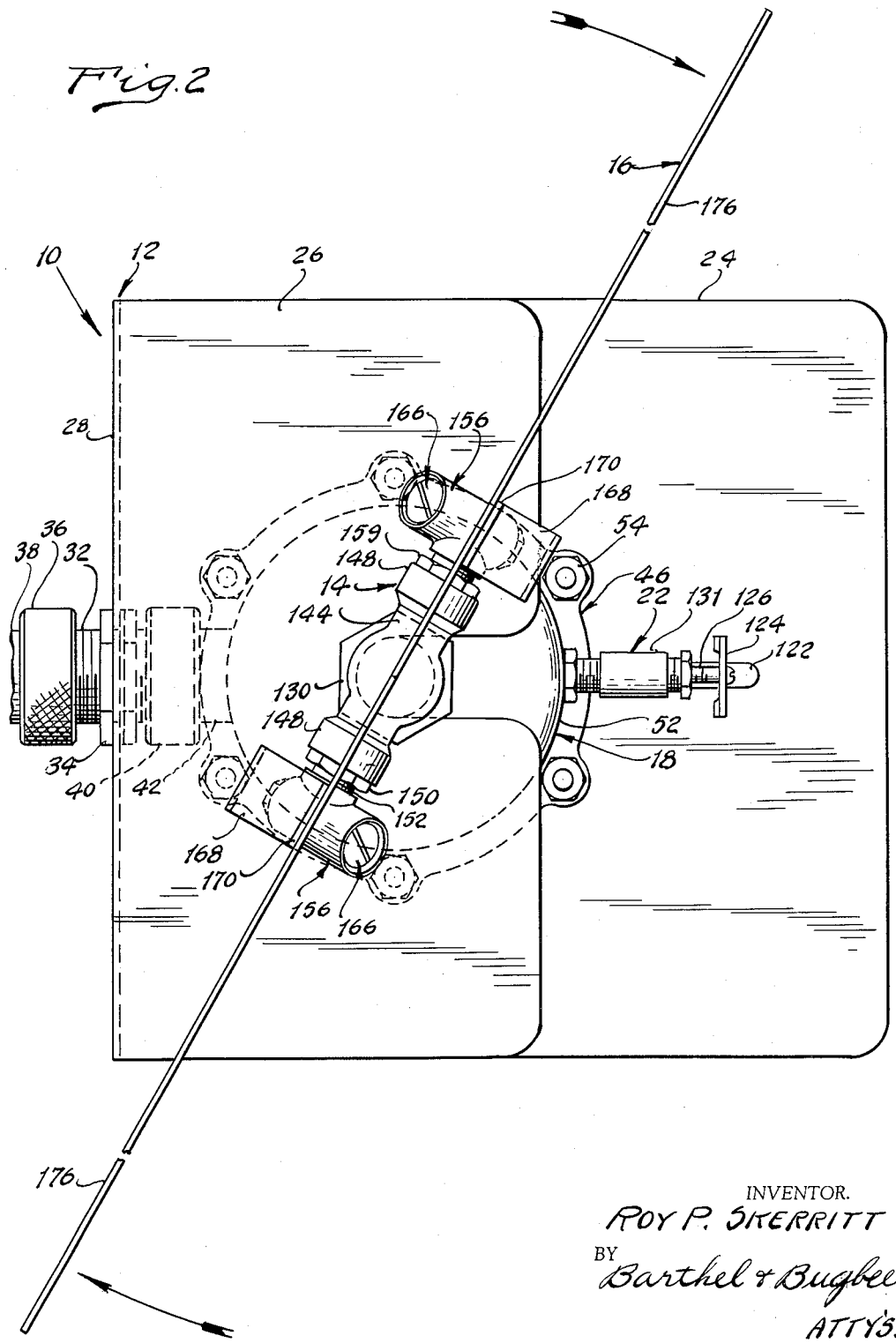

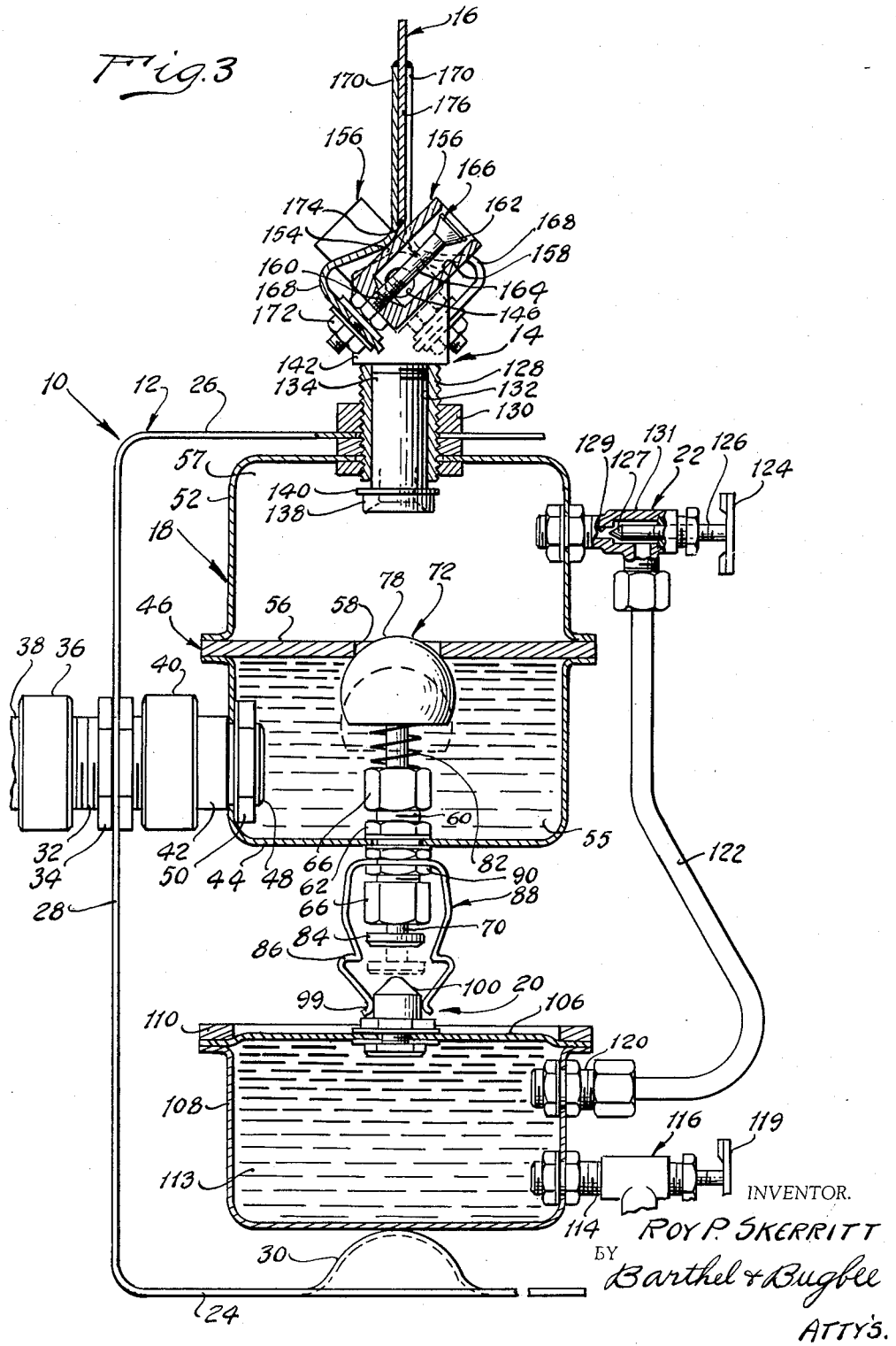

United States Patent Office 3,089,651
Patented May 14, 1963

3,089,651
LAWN SPRINKLER WITH TIMED
AUTOMATIC SHUTOFF
Roy P. Skerritt, 18411 Inkster Road, Livonia, Mich.
Filed July 6, 1959, Ser. No. 825,323
1 Claim. (Cl. 239—68)

This invention relates to sprinklers and, in particular, to lawn sprinklers.

One object of this invention is to provide a lawn sprinkler which will operate for an adjustable period of time to sprinkle the lawn and at the end of that period of time will shut itself off automatically without the necessity for attention thereto on the part of the operator.

Another object is to provide a lawn sprinkler of the foregoing character wherein the automatically-timed shut-off means is operated by the pressure of the water supplied to the lawn sprinkler, and hence does not require mechanical or electrical timing mechanism with its complexity and fragility, particularly in the presence of the water which is necessarily being sprayed in all directions by the sprinkler.

Another object is to provide a lawn sprinkler of the foregoing character wherein the water supply shutoff valve is normally resiliently held in its open position permitting unrestricted flow of water to the sprinkler nozzle or nozzles, but which is released to move into its closed position by a latch device actuated by the gradual flow of water into an auxiliary chamber, a diaphragm of which ultimately operates the latch device to release the shutoff valve to move into its shutoff position, when the auxiliary chamber has received a predetermined amount of water escaping from the main chamber of the sprinkler.

Another object is to provide a lawn sprinkler having rotary sprinkling nozzles equipped with an air brake vane mounted on and rotatable with the nozzle and retarded by the resistance of the air to slow down the rotation of the nozzle.

Other objects and advantages of the invention will become apparent during the course of the following description of the accompanying drawings, wherein:

FIGURE 1 is a central vertical section through a lawn sprinkler with a timed automatic shutoff and air brake, according to one form of the invention with the parts in their positions occupied at the start of sprinkling and with certain portions of the air brake vane omitted to conserve space;

FIGURE 2 is a top plan view of the lawn sprinkler shown in FIGURE 1, with the nozzle and vane rotated into a position diagonally of the sheet; and FIGURE 3 is a view similar to FIGURE 1, but with the nozzles and vane rotated into a plane perpendicular to the sheet and with the parts in their positions occupied after atuomatic shutoff has occurred.

Referring to the drawings in detail, FIGURE 1 shows a lawn sprinkler with timed automatic shutoff, generally designated 10, according to one form of the invention as consisting generally of a supporting structure 12, a rotary lawn sprinkler head 14 rotatably mounted thereon and equipped with an air brake vane 16, a shutoff valve device 18 and a hydraulically-operated latch device therefor, generally designated 20, controlled by a shutoff timing adjustment control valve 22. The supporting structure 12 consists of a sheet of metal having substantially parallel base and top portions 24 and 26 respectively joined to one another by an upright portion 28. The base or bottom portion 24 is longer than the top portion 26 so as to extend horizontally beyond it (FIGURE 2) in order to provide a wide area of support giving exceptional stability against overturning, as well as serving as a skid or sled enabling the sprinkler 10 to be dragged across the lawn by the operator using the hose as a tow line. The base or bottom portion 24 has a hump 30 disposed immediately beneath the latch device 20 in supporting relationship therewith.

The upright portion 28 of the supporting structure 12 (FIGURE 1) is drilled to receive a threaded nipple 32 held thereagainst by lock nuts 34 and carrying at one end an internally-threaded rotary hose coupling collar 36 for the attachment of the male coupling of an ordinary garden house 38 (FIGURES 2 and 3). Threaded onto the inner end of the nipple 32 is the internally-threaded coupling collar 40 of a short pipe connection 42 to the cup-shaped lower or inlet shell 44 of the main shutoff valve casing, generally designated 46, of the shut-off valve device 18. The inlet shell 44 is drilled to receive the reduced diameter pipe portion 48 which is also threaded to receive a lock nut 50 mounted inside the lower shell 44. The inlet shell 44 is flanged and bolted to an inverted cup-shaped flanged upper shell or outlet shell 52 with an intermediate valve disc 56 which separates the shutoff valve casing 46 into lower inlet and upper outlet chambers 55 and 57. The disc 56 has a valve seat or valve opening 58 in the center thereof.

The inlet shell 44 is drilled at the bottom to receive an externally-threaded shutoff valve plunger support or nipple 60 secured thereto by lock nuts 62 and having a longitudinal bore 64 therein. The nipple 60 at each of its opposite ends carries a flanged packing collar or gland 66 adapted to compress a packing 68 around a valve plunger 70 reciprocably mounted in the bore 64. The valve plunger 70 at its upper end is threaded to receive a movable valve member 72 of resilient material, such as synthetic rubber or synthetic plastic. The valve member 72 consists of a flanged internally-threaded collar 74 threaded upon the threaded upper end of the valve plunger 70 and held in place by a lock nut 76, and a partially spherical valve contact member 78 molded onto the flanged collar 74 and composed of resilient material, such as synthetic rubber or synthetic plastic. The valve member 72 is counterbored at the bottom as at 80 to receive the upper end of a compression spring 82 which normally urges it in an upward direction tending to engage and close the valve seat or opening 58. The lower end of the compression spring 82 engages the upper packing gland 66 as an abutment.

The lower end of the valve plunger 70 is provided with a disc-shaped head or flange 84 which is normally adapted to be held in a cocked position compressing the spring 82 with the shut-off valve head 72 lowered (FIGURE 1) by opposed shoulders 86 on an approximately U-shaped twin-armed spring latch or detent, generally designated 88, the central or bridge portion 90 of which is drilled to fit upon the nipple 60 between the lower lock nut 62 and the lower collar 66 and is held against the former by a lock nut 92. The twin arms 94 of the latch 88 carrying the shoulders 86 have converging intermediate and lower end portions 96 and 98 above and below the shoulders 86, and bent lower ends 99 for engagement by an approximately conical spreader or unlatching cam or plunger 100. The unlatching cam or plunger 100 is internally threaded upon a threaded fastener 102 and shifted by a hydraulically-operated motor 104 including a centrally-drilled flexible diaphragm or motive member 106 which is normally dished downward (FIGURE 1) and a cup-shaped auxiliary casing 108 to the flanged edge of which it is secured by a clamping ring 110 and bolts 112. The auxiliary casing 108 has a chamber 113 therein and rests upon the hump 30 on the bottom portion 24 of the supporting structure 12, and its side wall is drilled near its bottom wall to receive the threaded stem 114 of a drain valve, generally designated 116, held bolted thereto by nuts 118 and having a rotary valve member 119, rotation of which opens and closes the valve 116. The same side wall is also drilled near the top of the auxiliary casing 108 to receive a threaded pipe coupling 120 also bolted thereto. Coupled to the pipe coupling 120 is the lower end of a pipe 122 the upper end of which is coupled to the timing adjustment control valve 22 which is likewise bolted to the suitably drilled upper shell 52 of the main valve casing 26 and has a rotary valve member 124, the rotary shaft or rod 126 of which is a pointed needle valve rod with a pointed tip 127 (FIGURE 3) which is movable relatively to a valve opening 129 in the valve casing 131, for providing minute adjustment of the rate of flow of water from the upper chamber 57 to the auxiliary chamber 113, as described below in connection with the operation of the invention.

The top of the inverted cup-shaped upper shell 52 of the main valve casing 46 is drilled to receive a threaded nipple 128 held in place by lock nuts 130 which also secure it to the similarly-drilled top portion 26 of the supporting structure 12 (FIGURE 1). Rotatably mounted in the longitudinal bore 132 of the nipple 128 is the tubular stem 134 having a water passageway 136 leading therethrough from a flange or head 138 on the lower end thereof and abutting a thrust washer 140 on the lower end of the nipple 128 as a thrust bearing.

Threaded upon the threaded upper end of the rotary tubular stem 134 is the internally-threaded boss 142 of a tubular T-member 144 (FIGURE 1), the T-shaped passageway 146 of which terminates in oppositely-disposed internally-threaded bosses 148. Threaded into each of the bosses 148 and held in a fixed position thereagainst by a lock nut 150 is the threaded shank 152 of a T-shaped casing 154 of a spray nozzle, generally designated 156. The casing 154 of the spray nozzle 156 is bored as at 158 and counterbored and threaded as at 160 (FIGURE 3) to receive the tapered head 162 and threaded stem 164 respectively of the spray nozzle baffle member 166, the lower end of which carries an L-shaped arm 168 of a bracket 170 welded or otherwise secured to the vane 16 and held in place by lock nuts 172. The head 162 is of slightly smaller diameter than the bore 158 for water flow therebetween. The two spray nozzles 156 are inclined in opposite directions for the purpose of imparting rotation to the rotary sprinkler head 14 (FIGURES 2 and 3) and consequently the brackets 170 are secured to opposite sides of the vane 16 and their arms 168 are likewise bent in opposite directions (FIGURE 3).

The air brake vane 16 which is thus supported by the brackets 170 at spaced locations on opposite sides of the axis of rotation 172 of the sprinkler head 14 consists of an elongated strip of sheet material, such as sheet metal or sheet plastic having a central cutaway portion 174 adapted to receive the T-member 144 and has laterally-projecting widened end blades or wings 176 which, when the vane 16 is rotating, encounter air resistance and consequently retard the rotation of the sprinkler head 14.

In the operation of the invention, let it be assumed that the operator has drained the auxiliary chamber 113 in the lowermost casing 108 by means of the drain valve 116 and that he has pushed the head 84 of the shutoff valve plunger 70 downward past the intermediate converging portions 96 of the spring lastch 88 until it has spread apart the resilient arms 94 which snap into position above it at the shoulders 86. The parts are now in the positions shown in FIGURE 1, with the possible exception of the fact that if this is the first use of the sprinkler 10, the upper and lower chambers 57 and 55 and the lowermost chamber 113 would have no water in them.

Having adjusted the baffle members 166 of the spray nozzle 156 for the desired type and volume of spray, the operator then opens the hose faucet (not shown) to admit water under pressure to the hose 38 to which the lawn sprinkler 10 is connected. The water, emerging from the threaded end 48 of the short pipe connection 42 (FIGURE 1) fills the lower chamber 55 in the lower shell 44 and flows through the valve opening 58 into the upper chamber 57 of the upper shell 52. The main portion of the flow of water passes upward through the bore 136 in the rotary T-member 134 and outward through the T-shaped passageway 146 and oppositely-inclined spray nozzle 156, emitting sprays in opposite directions and causing rotation of the sprinkler head 14 by the reaction in opposite directions thereby produced. Rotation is retarded by the resistance of the air to the rotary vane 16 attached to the springler head 14, thus slowing down the rotation of the latter and increasing the volume of water deposited on the lawn during each revolution of the sprinkler head 14.

Meanwhile, however, water under pressure has been conducted from the upper chamber 57 of the upper shell 52 of the shutoff valve casing 46 through the timing adjustment valve 22 and the pipe 122 into the chamber 113 of the auxiliary casing 108. As the water slowly accumulates and rises in the chamber 113, it eventually fills the chamber 113 and by reason of its pressure forces the resilient diaphragm 106 upward from the position shown in FIGURE 1 to that shown in FIGURE 3. This action pushes upward upon the conical-headed unlatching cam or plunger 100, forcing the lower end portion 99 of the spring arms 94 of the spring latch 88 apart, thereby separating the shoulder portions 86 laterally from one another a sufficient distance to permit the head or flange 84 on the shutoff valve plunger to pass between them, as the plunger 70 is forced upward by the compressed spring 82. This action urges the resilient movable valve member 72 into engagement with the valve opening 58 in the valve disc 56, cutting off further flow of water from the lower chamber 55 through the valve opening 58 into the upper chamber 57 and consequently terminating the action of the lawn sprinkler 10.

The lawn sprinkler 10 remains in its shutoff position of FIGURE 3 until the operator returns to it, opens the drain valve 116 by means of the rotary valve member 119, releasing the water from the auxiliary chamber 113. Assuming that the operator has meanwhile turned off the water supply faucet of the hose 38, the spring diaphragm 106 collapses downward from the position of FIGURE 3 to that of FIGURE 1, withdrawing the large diameter portion of the unlatching cam or plunger 100 from between the ends 99 of the spring arms 94, whose resilience causes them to spring together, so that their shoulders 86 are closer to one another than the diameter of the valve plunger flange 84. By pushing downward on the latter with his finger, the operator forces the head or flange 84 past the shoulders 86 into latching engagement with them at the location below them shown in FIGURE 1, thereby cocking the shutoff valve device 18 ready for the next sprinkling period. The sprinkler 10 can then be moved to another part of the lawn, either by carrying it bodily or by dragging it by means of the hose 38 as a tow line. The water faucet can then be turned on again, restarting the rotation of the sprinkler head 14 in the manner described above and again starting the accumulation of water through the timing adjustment valve 22 and pipe 122 into the auxiliary chamber 113 which eventually fills up and again actuates the latch 88 to again release the head 84 on the valve plunger 70 and cause its spring 82 to force its valve head 72 upward into closing engagement with the valve opening 58.

What I claim is:

A lawn sprinkler with timed automatic water shutoff comprising a support having a base portion adapted to rest upon the ground, a sprinkler spray nozzle mounted on said support, a valve casing mounted on said support and having an inlet chamber, a water supply hose coupling communicating with said inlet chamber, said valve casing having an outlet chamber hydraulically connected to said spray nozzle, said chambers being interconnected by a passageway having a valve seat therein; a valve member mounted in said casing for motion into and out of closing engagement with said valve seat, means normally resiliently urging said valve member into closing engagement with said valve seat, a resilient latch member having a movable latching arm normally holding said valve member out of closing engagement with said valve seat against the urge of said resiliently-urging means, a hydraulically-operated motor hydraulically connected to said inlet chamber and having a hydraulically-shifted motive member, and a latch releasing cam operatively connected to said motive member for movement co-directionally with said valve member into latch-releasing engagement with said latch member arm in response to the attainment of a predetermined hydraulic pressure within said hydraulic motor against said motive member.

References Cited in the file of this patent

UNITED STATES PATENTS

| | | |
|---|---|---|
| 1,645,763 | Lundberg et al. | Oct. 18, 1927 |
| 1,668,582 | Buckner | May 8, 1928 |
| 1,977,882 | Lassen | Oct. 23, 1934 |
| 2,767,416 | Snyder | Oct. 23, 1956 |
| 2,787,498 | Futrell | Apr. 2, 1957 |